Sept. 1, 1931. A. E. KINSLEY 1,820,914
GAME TRAP
Filed June 20, 1929  2 Sheets-Sheet 1
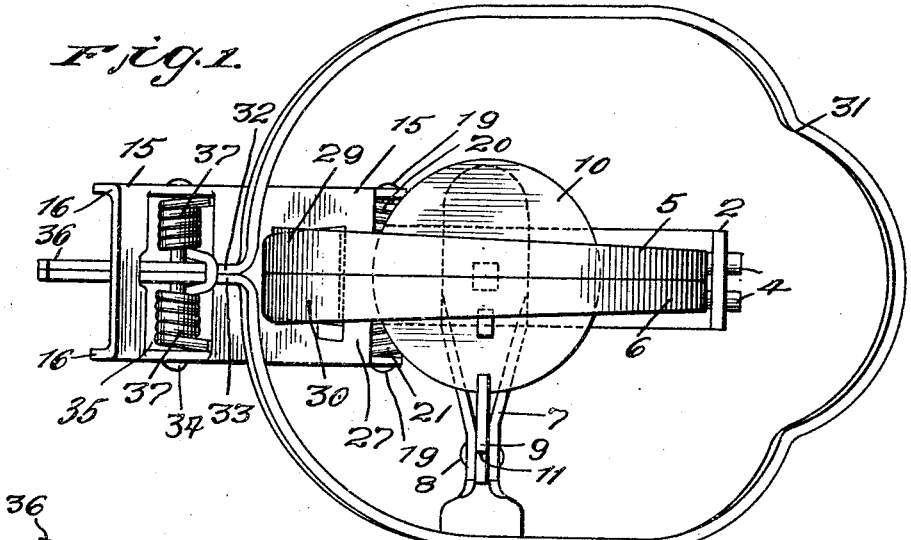
INVENTOR
ALBERT E. KINSLEY
BY
ATTORNEY

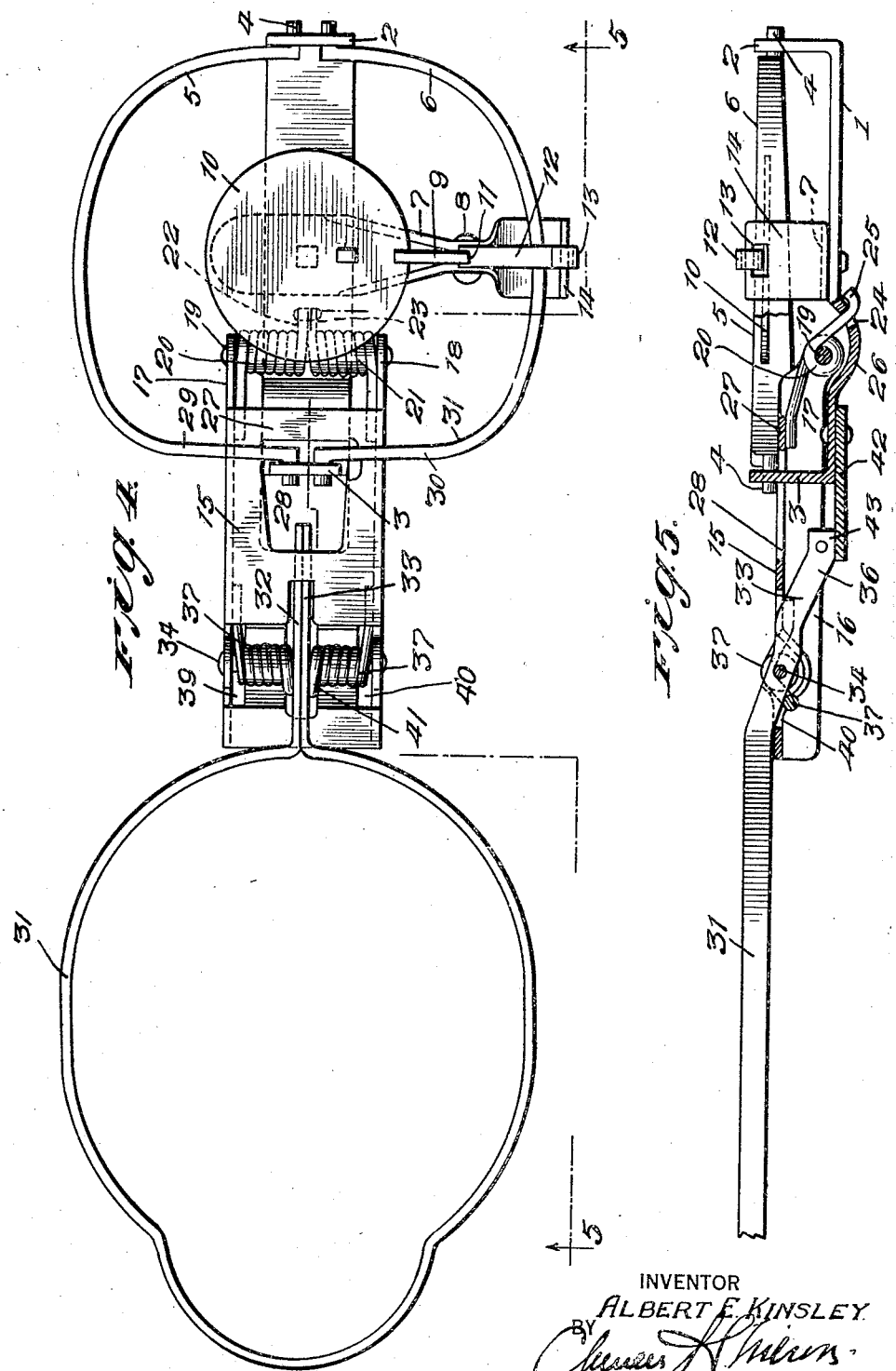

Patented Sept. 1, 1931

1,820,914

UNITED STATES PATENT OFFICE

ALBERT E. KINSLEY, OF ONEIDA, NEW YORK

GAME TRAP

Application filed June 20, 1929. Serial No. 372,274.

This invention relates to game traps, and more particularly to that type of game trap which has come to be known in the art as a "killer" trap.

One of the objects of the invention is to provide a trap which will operate more effectively to catch and hold in caught condition fur bearing animals than has obtained with traps of this character as hitherto constructed.

Another object of the invention is to provide a trap having primary jaw members and an independently operable secondary gripper member of novel construction, adapted to co-operate with the other parts of the trap to hold fast the trapped animal and to kill or hasten the death of the latter when once caught.

Other objects and aims of the invention more or less specific than those above referred to, will be in part obvious, and in part pointed out, in the course of the following description of the elements, combinations, arrangements of parts and applications of principles, constituting the invention; and the scope of protection contemplated will be indicated in the appended claims.

In the accompanying drawings, wherein I have illustrated a preferred form of embodiment of my invention, Figure 1 is a top plan view of my improved trap, showing the latter in closed position;

Figure 2 is a side elevational view of said trap;

Figure 3 is an end rear elevational view of the trap;

Figure 4 is a top plan view of the trap, showing the relative positions of the parts when the trap is in "set" position; and Figure 5 is a horizontal sectional view taken on the line 5—5 of Figure 4.

Referring now to the drawings wherein similar reference characters refer to similar parts throughout the several views thereof, the reference numeral 1 denotes the base or foundation of the trap having the upstanding, apertured, flanged portions 2 and 3, which receive the pintles 4 of the primary jaw members 5 and 6. The base 1 is provided with a cross-piece 7, to which is pivoted at 8, an arm 9, the latter carrying the pan 10 of the trap. The arm 9 is provided with the usual shoulder or catch 11, which co-operates with the end of a detent 12, to hold the trap in set position, said detent being pivoted at 13, to the upper end of an upstanding flange 14 formed on the cross-piece 7. The trap thus far described is of usual construction.

The reference numeral 15 denotes an actuating member for the primary jaws 5 and 6 of the trap. This actuating member, which is preferably formed of a strip of sheet metal, is provided with the side flanges 16, said side flanges having the forward extension 17 and 18, adapted to receive the pivot pin 19. This pivot pin 19 is, in the present instance, encircled by two coil springs 20 and 21. Free ends 22 and 23 of the springs 20 and 21 extend through an aperture 24 formed in the base member 1, the end of said springs being preferably hook shaped as at 25, as clearly shown in Figure 5, whereby the ends of said spring will not become easily displaced from the positions shown.

The base plate 1 is preferably formed with a hollow depression 26 to receive the springs 20 and 21. The opposite ends of the springs 20 and 21 extend underneath the actuating member 15 and engage the forward end thereof at the point 27, behind the point of pivotal support provided by the pin 19. Thus the action of the springs 20 and 21 is to swing such actuating member 15 upwardly. The springs 20 and 21 are, of course, put under tension during the assembling operation of the trap. The actuating member 15 is provided with an aperture 28 of sufficient size to receive the legs 29 and 30 of the primary jaw members 5 and 6, and also the flange 3 of the base so that when said actuating member swings upwardly, said upward swinging movement will close the primary jaws, as is usual in trap construction.

The reference numeral 31 denotes an auxiliary gripper member, preferably formed of a strip of sheet metal bowed out as shown, the bowed part being of sufficient size to embrace the primary trap structure already described. This auxiliary jaw member has rearwardly extending legs 32 and 33, which lie in engagement with each other, and which are mounted upon the pivot pin 34, extending between the flanges 16 of the actuating member 15 adjacent the rear end of the latter. The actuating member 15 is provided with an elongated aperture or slot 35 adapted to receive the legs 32 and 33 of the auxiliary jaw member 31. The legs 32 and 33 are extended rearwardly of the pivot pin 34 to provide what may be termed a "tail piece" 36.

Mounted upon the pivot pin 34 is a coil spring 37, the free ends of which extend through apertures 39 and 40 of the auxiliary member 15 and engage with the lower surface thereof. The intermediate portion of this coil spring, which is preferably bowed out, as shown at 41, engages with the legs 32 and 33 of the auxiliary member 31, the normal tendency of said spring being to swing said auxiliary member forwardly and rearwardly. This spring 37 is, of course, tensioned during the assembling operation of the trap.

Secured to a foundation 1 is a plate 42, said plate extending rearwardly, as clearly shown in Figures 2 and 5 of the drawings.

Having thus described the construction and operation of this embodiment of my invention, the operation thereof may now be understood. Assuming the parts to be in the position shown in Figures 1, 2 and 3 of the drawings, the auxiliary jaw member 31 is first swung upwardly and rearwardly upon its pivotal support upon the auxiliary member 15 and against the tension of the spring 37. The actuating member 15 is thereupon swung downwardly to permit the jaws 5 and 6 to move to their open positions, whereupon one of said jaws is locked by means of a detent 12, as usual in traps of this character. The downward movement of the actuating member 15 engages the free end 43 of the "tail piece" 36 with the plate 42. Inasmuch as the actuating member 15 is held in this downward position by means of the locked jaw 6, the auxiliary jaw member 31 will also be locked, as shown in Figures 5 and 6, by reason of the engagement of end 43 of the "tail piece" with the plate 42.

When the trap is sprung, permitting the primary actuating member 15 to swing upwardly, the end 43 of the "tail piece" will escape the plate 42, whereupon the spring 37 will become operative to swing the auxiliary jaw member 31 upon its point of pivotal support upon the primary jaw actuating member. This auxiliary jaw member will then swing upwardly and it will be noted that by reason of the fact that it is mounted upon the actuating member, it will have a compound swinging movement due to the fact that its point of pivotal support is moved upwardly and forwardly by the actuating member 15. This construction provides that the auxiliary jaw member will strike downwardly, minimizing chances of striking or forcing the trapped animal out of the trap.

It will accordingly be seen that I have provided a trap construction adapted to attain, among others, all the ends and objects above pointed out in an extremely simple manner. By means of this construction the suffering of trapped animals is greatly alleviated, due to the fact that the animal cannot struggle when once caught, and the chances are that the animal will be killed outright by the operation of the auxiliary gripper member.

As many changes could be made in this construction without departing from the scope of the following claims, it is intended that all matter contained in the above description or shown in the accompanying drawing, shall be interpreted as illustrative only and not in a limiting sense.

Having thus described my invention, what I claim as new and desire to secure by Letters Patent is:

1. In a trap of the class described, in combination, a base plate provided with a pair of jaws, a spring actuating member for operating said jaws, and an auxiliary gripping member mounted upon said actuating member.

2. In a trap of the class described, in combination, a base plate having mounted thereon a pair of jaws, a pivotally mounted spring actuating member for operating said jaws, an auxiliary gripping member mounted upon said actuating member, and spring means also mounted upon said actuating member for operating said auxiliary gripping member.

3. In a trap of the class described, in combination, a base plate provided with a pair of pivotally mounted jaws, an actuating member pivotally mounted upon said base plate, spring means for operating said actuating member, an auxiliary gripping member mounted upon said actuating member, and spring means for operating said auxiliary gripping member.

4. In a trap of the class described, in combination, a base plate provided with a pair of pivotally mounted jaws, an actuating member pivotally mounted upon said base plate, spring means for operating said actuating member, an auxiliary gripping member mounted upon said actuating member, and spring means for operating said auxiliary gripping member, said auxiliary gripping member being movable with and relative to said actuating member when the trap is sprung.

5. In a trap of the class described, in combination, a base plate, a pair of jaws pivotally mounted upon said base plate, a pivotally mounted actuating member for said jaws mounted upon said base plate, a spring for operating said actuating member, an auxiliary gripping member pivotally mounted upon said actuating member, a spring for operating said auxiliary gripping member, means for setting said jaws against the tension of their actuating spring, and means carried by the base plate for setting said auxiliary gripping member against the tension of its actuating spring.

In testimony whereof, I affix my signature.

ALBERT E. KINSLEY.